United States Patent Office 2,778,512
Patented Jan. 22, 1957

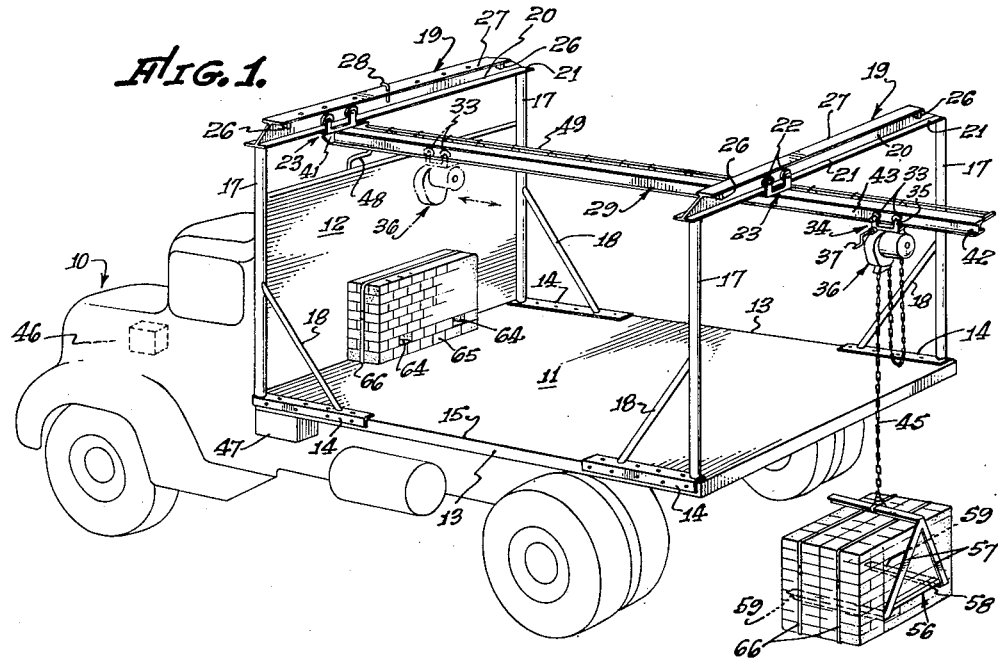

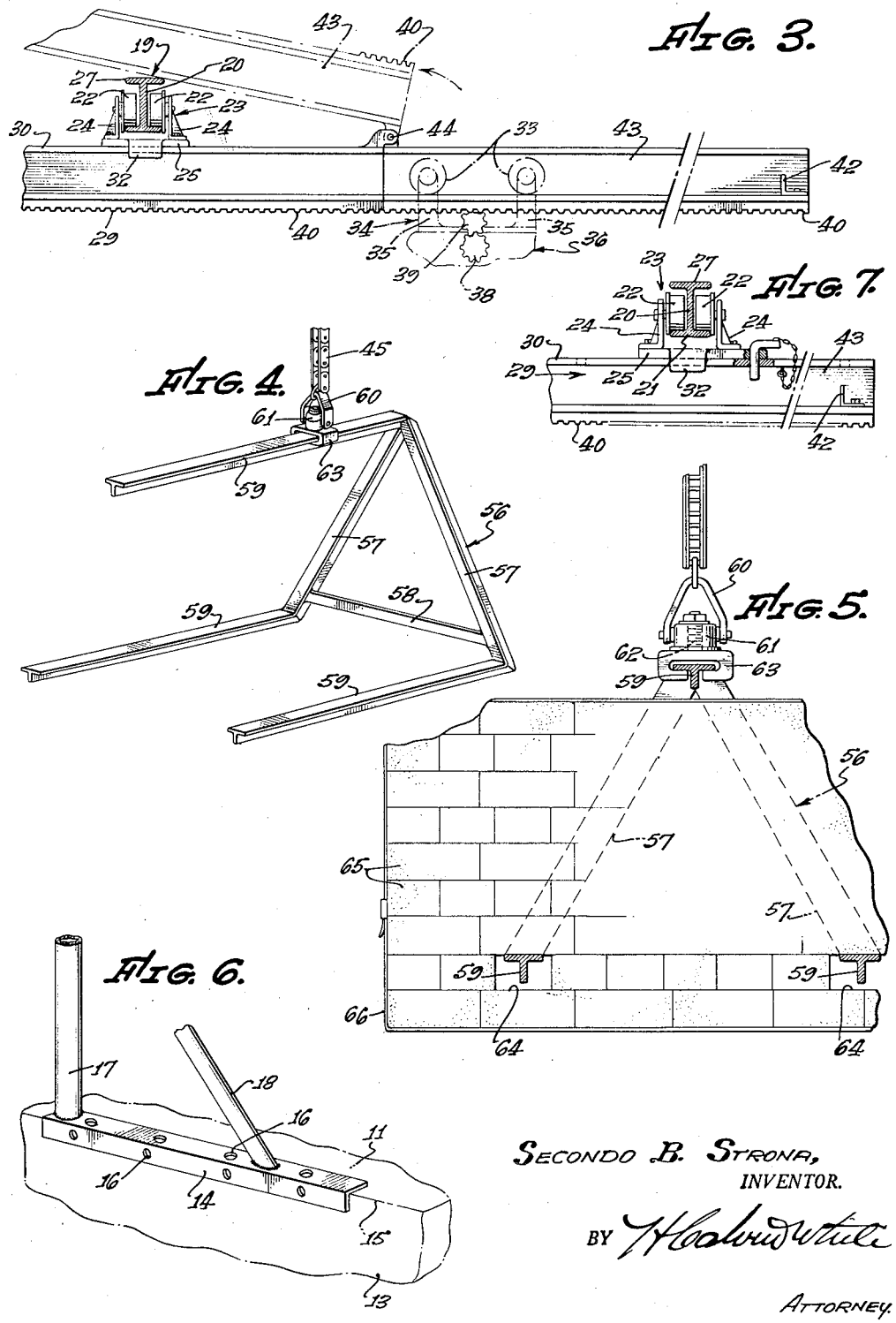

2,778,512

PORTABLE TRUCK CRANE

Secondo B. Strona, Pomona, Calif.

Application February 28, 1955, Serial No. 491,052

8 Claims. (Cl. 214—75)

This invention has to do with portable crane mechanism and more particularly concerns crane structure adapted for use on truck-type vehicles in moving freight on and off platforms formed on such vehicles so as to substantially reduce the time and effort expended in loading and unloading operations. More particularly, the invention is directed to a novel crane structure adapted to be quickly and easily mounted upon a conventional truck platform or bed in order to convert an ordinary truck for handling freight by means of a hoisting mechanism supported by the crane structure, to the end that the loading and unloading of the truck and movement of freight upon the platform may be accomplished with maximum efficiency.

At the present time loading and unloading freight from conventional trucks is largely accomplished either by hand or by separate loading mechanism such as fork lifts and the like, such lifts typically being moved under power onto a truck platform from a ramp against which the truck has been backed. While such freight moving and handling methods are acceptable, their use is limited insofar as it is necessary that a ramp be provided from which freight may be moved onto the vehicle platform, and in those instances where no ramp is available it becomes increasingly difficult to handle freight on the truck platform.

The present invention has for its general object to provide a portable crane apparatus which is readily connectible upon an ordinary truck in such a way that the freight may be conveniently and quickly moved on and off the truck platform from the ground level and under circumstances where no ramp is available. More specifically, the invention contemplates the provision of a track assembly including a movable track adapted to carry a chain hoist or the like for movement over the truck platform and also in overhanging relation to the ground at the rear of the platform, in which latter position freight may be raised or lowered from the ground level to the platform at the rear of the truck. Provision is made for hoist movement in a second direction over the platform, preferably normal to the direction of extension of the movable track in order that the freight carried by the hoist may be loaded on or removed from any point on the platform, a pair of laterally extending tracks supporting the longitudinal track being included for this purpose.

In order that the track assembly may be quickly removed from or attached on the vehicle, a framed support structure is arranged for carrying the laterally extending tracks in fixed overhead position relative to the platform, the support structure including bases which are readily connectible to the sides of the platform and uprights carried by the bases and mounting the laterally extending tracks.

Certain important details of the invention include the provision of a movable track extension or end portion adapted to overhang the rear of the platform, with a pivot connection being optionally provided to allow forward swinging movement of the extension into a stored position, as will be fully described. The hoisting apparatus preferably comprises an electrically driven chain hoist suspended from the movable track and adapted to be moved therealong by hand cranking mechanism.

The invention finds special utility in handling stacked blocks such as bricks, as by means of a special fork suspended from the chain hoist and adapted to lift the bricks to move them on or off the truck platform. To accomplish transportation of the stacked bricks, it is contemplated to hold them in integral stacked condition as a unit, and for this purpose a metal strap is tightened around the bricks after they have been stacked side-by-side and in vertically arranged horizontally extending layers, forming a compact pile having vertical sides and a horizontal top and bottom around which the strap extends. The strapped bricks are conveniently lifted as a unit for transportation by inserting the fork lift into openings formed in the stack by leaving out one or more bricks in a lower horizontal layer, raising of the fork transmitting lifting forces to the bricks above the openings and serving to move the stack of bricks as a unit.

Additional features and objects of the invention, as well as the details of an illustrative embodiment thereof, will be more fully understood from the following detailed description of the accompanying drawings, in which:

Fig. 1 is a perspective view of the crane apparatus mounted on a truck and lifting a load of freight;

Fig. 2 is an enlarged view showing the hoist mechanism and certain details of the track structure;

Fig. 3 is an enlarged elevation illustrating a modified track extension;

Fig. 4 is a perspective view of the special lifting device for handling stacked bricks;

Fig. 5 is an enlarged view of the lifting device shown in Fig. 4 and illustrating its use;

Fig. 6 is a perspective view of the support mechanism for the crane structure;

Fig. 7 is an elevation further illustrating the details of the track assembly and taken at right angles to the view of the assembly shown in Fig. 2; and Fig. 8 is a wiring diagram showing the electrical connections for the powered hoist.

Referring to the drawings, Fig. 1 shows a truck 10 carrying a horizontal platform or bed 11 with a batter board 12 extending vertically at the front of the platform and positioned adjacent the rear of the cab of the truck. For purposes of the invention, the truck shown may be of any conventional type, and may be provided with removable sides and a tail gate or similar structure, it only being necessary that some form of platform be provided on the truck.

Connected to opposite sides 13 of the platform are front and rear angle brackets 14, which may comprise elongated right-angle brackets adapted to seat against side and top portions of the platform adjacent the upper edges 15 thereof, the brackets having holes 16 formed therein to receive bolts or other retaining members, not shown. The latter serve to removably connect the brackets to the sides of the platform against lateral displacement, vertical displacement being resisted by the weight of the apparatus supported by the brackets and by side bolts connecting the brackets to sides 13.

Joined to each bracket are a vertical member 17 and an angular brace 18 connected thereto in supporting relation at a point above the bracket. Upper portions of the vertical members 17 carry front and rear I-beams 19 extending laterally across forward and rear portions of the platform 11 in overhead relation thereto and parallel to one another at substantially the same height above the platform. The I-beams are preferably of the wide flange type, having a vertical web 20 and oppositely and laterally extending lower flanges 21, the elongated upper surfaces of which form tracks for supporting wheels 22 of trolleys 23.

Each of the forward and rear trolleys 23 also includes trucks 24 supporting the wheels and connected to a base 25 extending beneath the I-beam in suspended condition, so that the trolley is freely movable along the extent of the I-beam between limit stops 26 formed at opposite ends of the beam by angled brackets depending from upper flange 27 thereof. To hold the trolley in desired intermediate positions there are provided stop pins 28 insertible downwardly through holes formed in upper flanges 27 of the I-beams for engagement with the trolley wheels.

The trolleys 23 support a third I-beam 29 extending horizontally and longitudinally relative to the truck platform 11 beneath the transverse I-beams 19. I-beam 29 also includes top and bottom wide flanges 30 and 31, the former being suspended by supports 32 connected to bases 25 and extending beneath opposite sides of the flange 30 as shown in Fig. 2. The ends of supports 32 extending beneath flange 30 are sufficiently spaced beneath base 25 that relative sliding movement of I-beam 29 is permitted in a longitudinal direction to adjust its position relative to the platform 11 and over the cab of the truck.

The elongated upper surfaces of lower flange 31 of the I-beam provide tracks mounting wheels 33 of a trolley 34 for movement therealong, the latter including angled brackets 35 supporting the wheels and suspending an electrical hoist 36 beneath beam 29. For moving the hoist and the trolley 34 longitudinally along the I-beam 29 there is provided a hand crank 37 projecting from the side of the hoist and having a spur gear 38 mounted below and meshing with a pinion 39 also supported by the hoist. The pinion meshes with a rack 40 formed or carried on the under surface of flange 31 in order that rotation of the hand crank may produce longitudinal movement of the hoist relative to and under the I-beam 29. The hoist is movable between stops 41 and 42 provided at opposite ends of the I-beams 29 and formed respectively by straight and angled brackets as shown in Figs. 1, 2 and 7, the brackets serving to engage wheels 33 of trolley 34.

The end portion 43 of I-beam 29 projecting beyond the rear of platform 11 may be formed integrally with the remainder of the I-beam as shown in Fig. 1, or may comprise a separate section as shown in Fig. 3. In that form, a pivot connection 44 joins the separate section 43 to the remainder of the I-beam in end-to-end relation in extended position, while alternately accommodating forward and upward swinging movement of the extension 43 to the alternate position shown, in which the extension rests upon the rear transverse I-beam 19 in stored condition. The track 40 is also formed on the under side of extension 43 to accommodate movement of the hoist on the extension, as shown by the broken lines in Fig. 3. The form of the invention illustrated in Fig. 3 also includes a direct bolted connection between the trucks 24 and the top web 30 of beam 29. The described methods for reducing overhanging of the rearward extension 43 of I-beam 29 beyond the rear of the platform including forward pivoting of the extension, or forward sliding movement of the complete I-beam structure as accommodated by the slip connections or supports 32, have for their purpose the elimination of accident hazards that would otherwise be present as a result of rearward projection of the I-beam extension during the course of truck movement.

Chain hoist 36 preferably though not necessarily comprises an electrically powered unit of a conventional type including a motor and sprocket, not shown, for raising and lowering a chain 45 hanging downwardly for lifting purposes. In keeping with the concepts of the invention having to do with the provision of a portable crane apparatus connectible on a truck, it is desired to power the electric hoist by means of truck batteries 46 and 47, shown in Fig. 1 to be carried respectively under the hood of the truck and beneath one side of platform 11. Cables 48 extending from the batteries to the electrical hoist pass upward forward of batter board 12 and along I-beam 29 underneath a rod 49 carried by the upper flange of the I-beam, the cable being supported by rings 50 hanging from the rod. Details of the electrical connections are shown in Fig. 8 to include the two 6 volt batteries 46 and 47 connected in series with the hoist motor 51 when double pole double throw switch 52 is connected with contacts 53, under which circumstances the motor receives current from a 12 volt source. When the switch 52 is thrown oppositely for connection with contacts 54, the batteries 46 and 47 are connected in parallel with the truck generator 55, and under these circumstances, the latter is adapted to charge each of the 6-volt batteries through appropriate voltage regulators not shown.

In Figs. 4 and 5 there is shown a form of lifting device 56 typically of T-iron construction and adapted to lift and transport stacked blocks or bricks for moving them on or off the truck platform 11. The lifting device includes an A-frame having legs 57, a cross brace 58 and three lateral extensions 59, the lower pair of which form a fork with the upper extension lying parallel thereto midway between and vertically above them. For lifting purposes, the lower end of chain 45 is connected to the upper extension 59 through a swivel connection including a fork 60 pivotally supporting a vertical swivel housing 61. The latter encloses a central vertical pivot 62, to the lower end of which is connected a C-shape collar 63 gripping lateral flanges on the upper extension 59 and forming a slip connection therewith for center of gravity adjustment purposes.

For loading bricks on or off the truck platform 11, the two lower fork members 59 are slipped into openings 64 provided by removing certain bricks in a horizontal layer of the stack, so that upward movement of the lift 56 will impart lifting force to the bricks above opening 64. For this purpose, a flexible metal strap 66 is tightly connected around the sides and top and bottom of the stack to hold the bricks in position and to prevent their separation during lifting movement and transportation. The bricks themselves are preferably stacked side-by-side and on top of one another to form a vertical series of horizontal brick layers. As better shown in Fig. 1, the stacked group of bricks may be raised from ground level by the hoist which has been cranked under extension 43 overhanging the rear of the platform 11. Once the bricks have been elevated above platform level, the hoist may be cranked oppositely to move the bricks back over the platform in a longitudinal sense and the I-beam 29 may be separately or simultaneously pushed laterally over the platform, the combination of longitudinal and lateral travel enabling placing of the bricks at any desired platform location. Similarly, removal of the bricks from the platform may be readily accomplished by a combination of lateral movements of the I-beam 29 and longitudinal movements of the hoisting mechanism. It is of course understood that other types of freight may be moved on or off the platform by means of the forked device 56 or any other suitable lifting mechanism.

The present invention may also be installed on a dump truck platform upon which freight may be stored by the crane mechanism for later conventional dumping, as by pivoting the platform 11 rearwardly. For example, a combination load of stacked and unstacked bricks may be loaded on the platform 11, the former being removed first by the hoisting mechanism and the latter being subsequently removed as by dumping them at a separate location.

I claim:

1. Ambulatory crane apparatus for attachment to a trucking vehicle platform in overhead freight moving relation therewith, comprising a horizontally extending track and hoist assembly including an elongated movable track having upper and lower flanges, a hoist suspended from said lower flange for movement beneath and in the direction of said track, a parallel pair of I-beams extending over and at an angle to said track and a pair of carriages respectively movably suspended from the lower oppositely extending flanges of said I-beams and mounting said track for horizontal movement in the direction of extent of said I-beams in overhead relation to said platform and for overhang at the rear end thereof, said carriages including fixed elements freely supporting said upper flange to accommodate displacement of said I-beams changing the relative spacing therebetween and track displacement in the direction of track elongation for adjusting the amount of said overhang, and supports positioned beneath and mounting said I-beams with relative spacing less than the length of said track, said supports including bases removably connectible to side portions of said platform.

2. Ambulatory crane apparatus for attachment to a trucking vehicle platform in overhead freight moving relation therewith, comprising a horizontally extending track and hoist assembly including a longitudinally extending movable track having upper and lower flanges, an electric hoist suspended from said lower flange for guided longitudinal movement therebeneath, a pair of I-beams extending laterally in parallel longitudinally spaced relation over said track and a pair of carriages respectively movably suspended from the lower oppositely extending flanges of said I-beams and together mounting said track for lateral horizontal movement in overhead relation to said platform and for overhang at the rear end thereof, said carriages including fixed elements freely supporting said upper flange to accommodate displacement of said I-beams changing the relative longitudinal spacing therebetween and longitudinal track displacement for adjusting the amount of said overhang, and supports positioned beneath and mounting said I-beams with relative longitudinal spacing less than the length of said track, said supports including bases removably connectible to side portions of said platform.

3. The invention as defined in claim 2, in which said carriages are confined substantially beneath said I-beams and said track extends therebeneath.

4. The invention as defined in claim 3, in which said track comprises another I-beam and said elements comprise fixed shoulders supported by said carriages and projecting oppositely beneath the upper flanges of said other I-beam on opposite sides thereof in slidably supporting relation therewith.

5. The invention as defined in claim 2, in which said supports include uprights connected between said bases and said I-beams, and said bases comprise angled brackets adapted to seat against and removably fasten to side portions of said platform.

6. The invention as defined in claim 2, comprising a separate track extension forming said overhang and including a pivot connection mounting said extension to the end of the track for independent swinging movement away from the direction of track elongation and back toward the track.

7. The invention as defined in claim 2, including a fork for lifting freight on and off said platform and a vertical swivel connection between said fork and said hoist.

8. The combination, comprising a trucking vehicle including a longitudinally extending freight carrying platform at the rear thereof, a horizontally extending track and hoist assembly positioned above said platform in freight moving relation therewith including a longitudinally extending movable track having upper and lower flanges, an electric hoist suspended from said lower flange for guided longitudinal movement therebeneath, a pair of I-beams extending laterally in parallel longitudinally spaced relation over said track and a pair of carriages respectively movably suspended from the lower oppositely extending flanges of said I-beams and together mounting said track for lateral horizontal movement in overhead relation to said platform and for overhang at the rear end thereof, said carriages including fixed shoulders freely supporting said upper flange to accommodate displacement of said I-beams changing the relative longitudinal spacing therebetween and longitudinal track displacement for adjusting the amount of said overhang, and supports extending between said platform and I-beams and mounting said I-beams with relative longitudinal spacing less than the length of said track, said supports including bases removably connected to side portions of said platform.

References Cited in the file of this patent

UNITED STATES PATENTS

| | | |
|---|---|---|
| 1,745,045 | Romine | Jan. 28, 1930 |
| 2,177,525 | Henderson | Oct. 24, 1939 |
| 2,428,144 | Clough | Sept. 30, 1947 |
| 2,478,513 | Te Desco | Aug. 9, 1949 |
| 2,499,442 | Wright | Mar. 7, 1950 |
| 2,557,253 | Belden | June 19, 1951 |
| 2,646,180 | Schlough et al. | July 21, 1953 |
| 2,658,614 | Van Patten | Nov. 10, 1953 |
| 2,730,249 | Edwards | Jan. 10, 1956 |